United States Patent
Monk et al.

(10) Patent No.: US 10,254,523 B2
(45) Date of Patent: Apr. 9, 2019

(54) DIGITAL PORTABLE MICROSCOPE

(71) Applicant: IOLIGHT LIMITED, Hampshire (GB)

(72) Inventors: Andrew Monk, Hampshire (GB); Richard Williams, Hampshire (GB)

(73) Assignee: IOLIGHT LIMITED (GB)

( * ) Notice: Subject to any disclaimer, the term of this patent is extended or adjusted under 35 U.S.C. 154(b) by 186 days.

(21) Appl. No.: 15/126,099

(22) PCT Filed: Feb. 24, 2015

(86) PCT No.: PCT/GB2015/000062
§ 371 (c)(1),
(2) Date: Sep. 14, 2016

(87) PCT Pub. No.: WO2015/145098
PCT Pub. Date: Oct. 1, 2015

(65) Prior Publication Data
US 2018/0081157 A1 Mar. 22, 2018

(30) Foreign Application Priority Data
Mar. 24, 2014 (GB) .................................. 1405183.3

(51) Int. Cl.
*G02B 21/00* (2006.01)
*G02B 21/24* (2006.01)
*G02B 21/36* (2006.01)

(52) U.S. Cl.
CPC ......... *G02B 21/0008* (2013.01); *G02B 21/24* (2013.01); *G02B 21/362* (2013.01)

(58) Field of Classification Search
CPC .. G02B 21/0008; G02B 21/24; G02B 21/362; G02B 21/0088; G02B 21/025; G02B 21/06; G02B 21/368

USPC ................................ 359/391, 368, 363, 804
See application file for complete search history.

(56) References Cited

U.S. PATENT DOCUMENTS

| | | | |
|---|---|---|---|
| 8,624,967 B2 * | 1/2014 | O'Connell | G02B 21/0008 348/79 |
| 2012/0182608 A1 * | 7/2012 | Takeuchi | G02B 21/0008 359/363 |
| 2012/0224044 A1 * | 9/2012 | Lett | G01N 21/6428 348/79 |
| 2013/0260382 A1 * | 10/2013 | Ghosh | G02B 21/33 435/6.12 |

FOREIGN PATENT DOCUMENTS

| | | |
|---|---|---|
| CN | 2929752 Y | 7/2006 |
| CN | 201035217 Y | 3/2008 |

(Continued)

OTHER PUBLICATIONS

The International Bureau of WIPO, International Preliminary Report on Patentability PCT/GB2015/000062, dated Sep. 27, 2016, Geneva, Switzerland.

(Continued)

*Primary Examiner* — Collin X Beatty
(74) *Attorney, Agent, or Firm* — Luedeka Neely Group, PC

(57) ABSTRACT

A self contained, portable high resolution microscope featuring a flat base 1 to provide a stable optical platform capable of resolving parallel lines 10 μm apart. The microscope folds or collapses to a flat shape in order to make it very portable.

17 Claims, 4 Drawing Sheets

(56) References Cited

FOREIGN PATENT DOCUMENTS

| | | |
|---|---|---|
| CN | 202472111 U | 3/2012 |
| DE | 439662 | 1/1927 |
| EP | 0683413 A1 | 11/1995 |
| EP | 1220006 A3 | 7/2002 |

OTHER PUBLICATIONS

Dino-Lite Digital Microscope, The Industry Standard (28 pages) Dec. 31, 2013 General Brochure.
Intellectual Property Office, GB1405183.3, Combined Search and Examination Report under Section 17 ad 18(3) dated Sep. 29, 2014.

* cited by examiner

DIGITAL PORTABLE MICROSCOPE

This invention relates to a high resolution portable digital microscope.

CROSS-REFERENCE TO RELATED APPLICATION

This application claims priority under all applicable statutes, and is a U.S. National phase (37 U.S.C. Section 371) of International Application PCT/GB2015/000062, filed Feb. 24, 2015, and entitled DIGITAL PORTABLE MICROSCOPE, which claims priority to GB 1405183.3, filed Mar. 24, 2014, incorporated herein by reference in their entireties.

Conventional microscopes comprise a system of lenses that creates a magnified image of the subject, which can be viewed through an eyepiece, or detected by a digital camera and viewed on a screen. The subject is most often mounted on a standard 76 mm×26 mm microscope slide.

Conventional microscopes have a high centre of gravity and are only stable when placed on a solid flat surface. This makes it difficult to form a stable image outside the laboratory, for example in the field or classroom. Additional stabilisation can be added in the form of a stand, ballast weight or both. However, these add to the size and weight of the instrument and make it less portable.

Digital magnifiers are widely sold as 'microscopes' at much lower prices than laboratory microscopes. These devices can be used outside the laboratory to capture images onto digital memory or a screen. However, digital magnifiers usually have only mediocre practical resolution, because it is difficult to hold them still without adding a stand, ballast weight or both. The stand and ballast weight add to the size and weight of the magnifier and make it less portable. Furthermore, these magnifiers are usually not designed to view standard microscope slides, so it is difficult to use them for the large number of applications where the sample is mounted on a slide.

To overcome these problems, the present invention proposes an inherently stable high resolution portable microscope, which is compatible with standard 76 mm×26 mm microscope slides, so that it can be used for a wider range of applications than a digital magnifier.

The present invention achieves this by converting between two configurations: The first configuration is the operational mode, in which a sample placed on the base of the instrument is observed by a digital camera assembly above the sample. The second configuration is the transport mode, in which the base and digital camera assembly of the microscope convert to a flat shape making it extremely portable. Specifically, the present invention provides a self-contained microscope as set out in claim 1.

The flat shape is an essential feature of this invention. It should be understood that the term 'flat' means that the thickness of the package in transport mode is typically less than one third of both its width and its height. The flat surface of the package in transport mode may include features such as control knobs that stand proud of the surface or indentations recessed below the surface. The flat faces may also include surface featuring such as a wave finish to aid use. Nevertheless, in the transport configuration, the package is substantially flat and the overall thickness is much smaller than either its width or its height.

In operational mode, the height of the microscope proposed in this present invention is typically less than the maximum width of the base. The low centre of gravity and the flat base make it inherently stable and this stability allows the microscope to achieve a high optical resolution without additional stands or ballast.

The specifications of low cost digital magnifiers are generally good. However, digital magnifiers are usually hand held and it is extremely difficult, in practice, to hold the magnifier still enough to capture a good image. Digital magnifiers can indeed produce good images if they are firmly clamped to a tripod or a stand with ballast in its base. However, the addition of such a stand means that the equipment is no longer pocket size. The fundamental difference between low cost digital magnifiers and the present invention is that the present invention is self contained and can produce good images without an external stand or ballast.

The term 'self contained' is used in this document meaning that the invention is inherently stable without the need for external stand or ballast. This self contained construction, together with the ability to convert to a flat package, mean that the present invention can, in practice, produce good quality images from equipment that easily fits in a jacket pocket.

Another feature of the present invention is the use of small, low cost, optical components that have been developed for mobile phone cameras since the beginning of the 21st century. The development of mobile phone sensors and lenses facilitates the compact, high quality, low cost microscope claimed in this present invention.

The preferred embodiment of this invention uses a 2.1 or 5 Mega-pixel, or larger, high definition (HD), CMOS sensor as is used in mobile phone cameras and webcams. These sensors have small pixel sizes, typically less than 1.5-3 µm. This small pixel size means that the CMOS sensor itself is small, but still has a very high resolution. Typically the image formed on one of these sensors would have a maximum dimension (or diagonal) of 5-7 mm or less.

This small HD sensor means that the microscope can be compact and inexpensive, but it has another important benefit: It means that the image projected by the lens onto the sensor must be small. This means that the microscope can use a simple low cost lens with an aperture of 3-5 mm or less, rather than the expensive lens system used on laboratory microscopes to produce larger images.

So, it can be seen that the use of modern mobile phone optical systems in the preferred embodiment of the present invention enables a compact, low cost, high quality instrument.

In the present invention the image captured by the sensor may be displayed on a built in screen or sent, using wired or wireless communication, to devices such as smart phones; tablets; computers; and digital projectors connected either directly or over the internet. In this way images from the microscope may be stored; shared using social media or projected onto a screen for teaching applications.

The microscope proposed in this invention has several advantages over both current laboratory microscopes and digital magnifiers:
  The flat base and low centre of gravity mean that the microscope is very stable when it is being used, with the optical head fixed solidly in relation to the base. This makes it easier to achieve a high practical resolution than it is with digital magnifiers, where the optics are not fixed relative to the sample. It also means that a good resolution may be achieved without the addition of external stands or ballast that would reduce portability.
  The microscope converts to a flat package when not in use. This means it can fit easily into a pocket or small pouch and that it is significantly more portable than conventional laboratory microscopes. This portability means that users will take it with them more often, so that it will be readily available for applications in the field, classroom and elsewhere.

The connectivity features of the present invention facilitate easy sharing of high resolution images. This makes the invention extremely useful for applications such as scientific research in the field; metrology; teaching; home science and industrial test and measurement.

This invention includes a low cost mechanism for positioning a sample under the optical head to select the part of the sample to be viewed. Low cost magnifiers do not include a sample positioning mechanism and the sample must be positioned by hand. This makes low cost magnifiers hard to use in practice with any accuracy. Conventional laboratory microscopes use a sophisticated sample positioning system such as rack and pinion; lead screw or dovetail slide. These require expensive high precision machining to avoid mechanical slop. The positioning system proposed in this present invention provides sufficient accuracy and can be manufactured in volume at a relatively low cost.

The whole construction is compatible with high volume manufacturing methods for all of the components including the lens; sample positioning system; camera; electronics and case. This allows the microscope to be built at a lower cost than conventional laboratory instruments. The low manufacturing cost means that this high quality portable instrument may be made available to schools and families that may otherwise not be able to afford a quality instrument. It also makes the microscope highly applicable to the developing world and exposes a wider public audience to first hand scientific observation.

The present invention provides a self-contained microscope as set out in claim 1, with further preferred features set out in claim 2-21.

The invention will now be described solely by way of example and with reference to the accompanying drawings in which.

Figure 1:
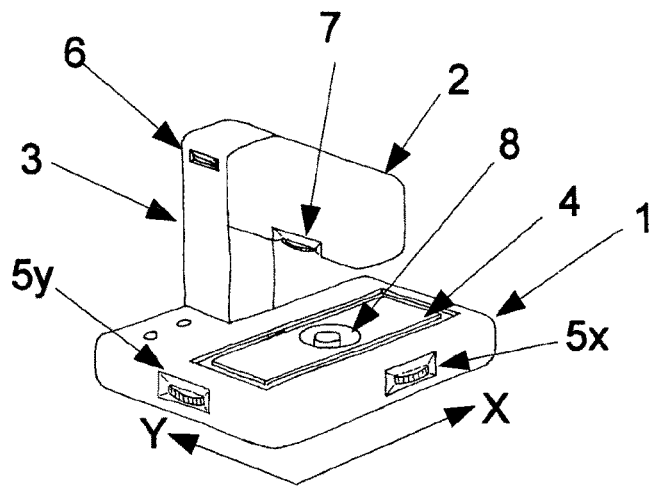
FIG. 1 shows a first embodiment of the microscope according to the invention, in operating configuration.

FIG. 1 shows a first embodiment of the microscope according to the present invention in operating mode. The microscope comprises a flat stable base 1 and an optical head 2 containing the digital camera and one or more lenses. The digital camera is typically a High Definition (HD), CMOS sensor with a resolution of 2.1 or 5 Mega-pixels and pixel sizes of less than 1.5-3 µm, though other sensors may be used. This camera can be a standard commercial component, as is widely used in web cams, mobile phones and other consumer goods. The preferred embodiment of this invention uses a simple, low cost plastic lens. Alternatively a more sophisticated multi element lens system may be used to further increase the quality of the image.

The head 2 is firmly held above the base 1 on an arm 3. The base may incorporate a sample stage 4, which may be moved in the directions of the X and Y axes shown using the positioners 5$x$ and 5$y$. This allows users to select the section of the sample that they wish to view with reasonable accuracy, whether the sample is mounted directly on the sample stage, or on a standard microscope slide placed on the sample stage. The sample stage incorporates a feature to hold a slide still, such as a slightly sticky rubber surface.

The adjuster 6 allows the head 2 to be raised and lowered relative to the base 1 to set coarse focus for samples of different height, for example pebbles, fingers, insects or flat samples on microscope slides. It is important that the head 2 locks securely to the arm 3 once it is in position to keep the whole assembly stable and achieve a quality image. A mechanism for achieving this is described with reference to FIG. 6 below.

Fine focus may be set using the focusing ring 7 on the objective lens. This may be adjusted manually or by an autofocus mechanism using a small electric actuator as widely used in mobile phones and webcams.

The base 1 may contain bottom illumination 8 provided by one or more LEDs. The head 2 may also contain top illumination provided by one or more LEDs (not visible in FIG. 1). The user may adjust the brightness of both the top and the bottom illumination to show the best image possible.

It can be seen that the height of the optical head 2 is typically less than the width of the base 1 in the operating mode. This gives the instrument a low centre of gravity and makes it very stable without needing external stands and ballast.

Figure 2:
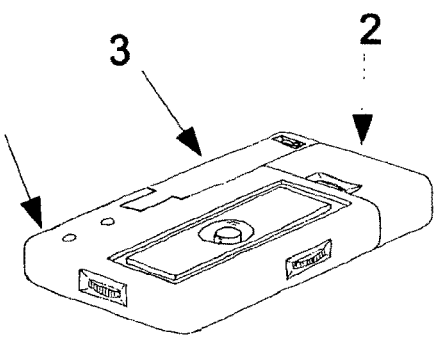
FIG. 2 shows the first embodiment of the microscope according to the invention, in flat configuration for transport.

In FIG. 2 the first embodiment of the microscope is converted to a flat configuration. It can be seen that the base 1, head 2 and arm 3 are coplanar forming a flat package that may conveniently be slid into a pocket or pouch for storage and transport.

Figure 3:
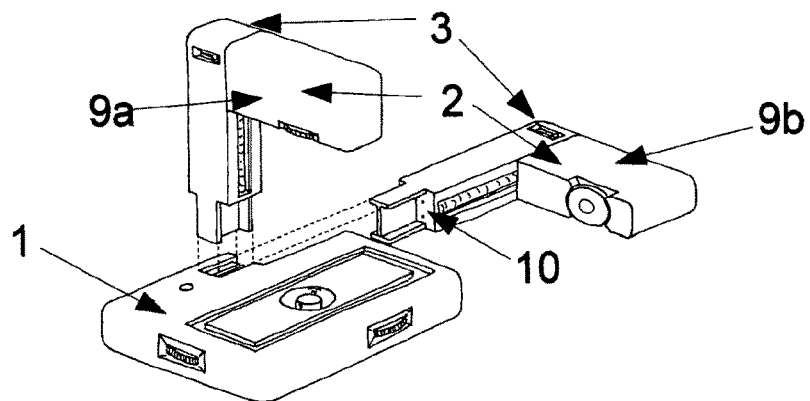
FIG. 3 shows how the first embodiment converts from operating mode to transport mode.

FIG. 3 illustrates how the first embodiment converts from operating mode to travel mode. In this embodiment the base 1 assembly and the head 2 and arm 3 assembly are two separate components. It can be seen that the head 2 and arm 3 assembly can be attached to the base 1 in position 9$a$ for operating mode or removed and reassembled in position 9$b$ for transport and storage. In this embodiment the bottom of the arm 3 may feature electrical connectors 10 to carry power and signal from the base 1 to the head 2.

Figure 4:
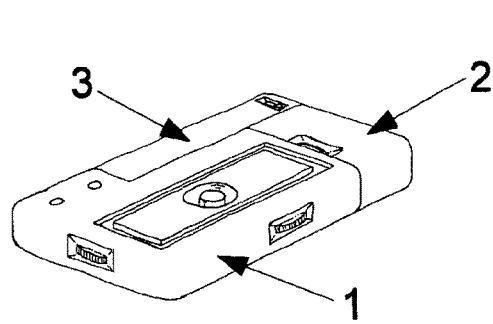
FIG. 4 shows a second embodiment of the microscope according to the invention, in flat configuration for transport.

FIG. 4 shows a second embodiment of the present invention converted to transport mode. This appears very similar to the first embodiment, however, in this second embodiment the conversion from operating mode to transport mode is achieved by a hinged joint between the arm 3 and the base 1, so that the base 1, arm 3 and head 2 are integrated into a single unit, in contrast to the two separate components of the first embodiment.

Figure 5:
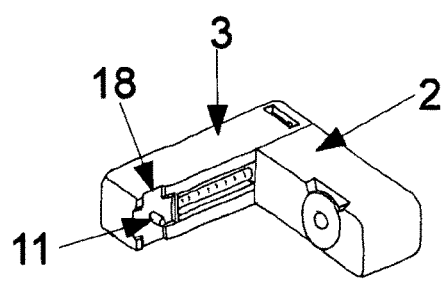
FIG. 5 shows the arm, optical head and hinge of the second embodiment.

FIG. 5 shows the arm 3 and head 2 of the second embodiment, with the base 1 removed in order to illustrate the hinge. The hinge comprises a threaded bar 11 set in the centre of a cruciform feature 18. These mount the arm firmly into an interlocking cruciform feature on the base 1, in both the operating and the transport position (Vertical and horizontal). The threaded bar has a hole in the centre through which is fed a thin cable carrying power and signal from the base to the head. The hole and cable are not shown in these illustrations.

Figure 6:
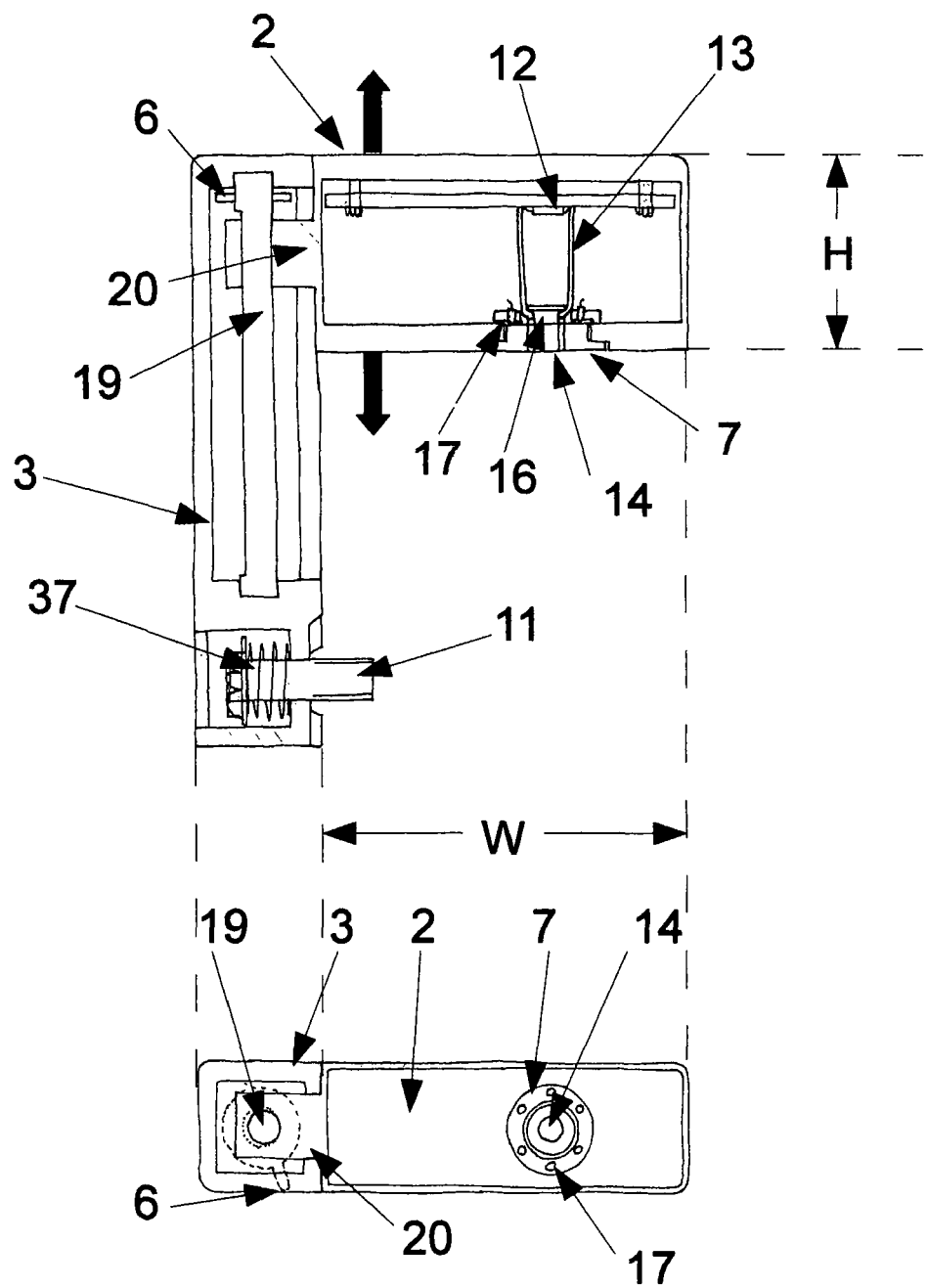
FIG. 6 shows vertical and horizontal sections through the arm and head illustrating the optical assembly.

FIG. 6 shows two sections through the head 2 and arm 3 viewed both from the side and from below, in operating mode.

The preferred embodiment uses a CMOS image sensor 12 of 2.1 or 5 Mega-pixels, or larger, with a pixel size of less than 1.5-3 µm and an image size (diagonal) of less than 5-7 mm, though other sensors may be used. This may be mounted on a 50 mm×20 mm circuit board, which is normal for commercial web cams, or a custom circuit board. In front of the sensor 12 a black baffle tube 13 may be fitted, to reduce the stray light reaching the sensor 12, and an objective lens 14.

The objective lens 14 in the preferred embodiment of this invention is a singlet (bi-convex) or achromatic doublet (possibly multi-element) lens with an aperture of 3 mm or less, or any other lens. It would normally be anti reflection coated with an aperture diffraction limit of around 1 µm. The focal length of the lens would typically be 6.5 mm, with an object distance of 10 mm and an image distance (from the lens to the sensor) of 19 mm. This optical design allows low cost plastic lenses to be used, if required, to minimise cost.

Using this optical design and sensor 12 gives a magnification of approximately 2 times, so that 1 pixel on sensor 12 would typically image 1.4 µm/2=0.7 µm on sample. Practical resolution with aberrations will be worse than 0.7 µm, but nevertheless easily good enough to resolve 10 µm lines. Preferably the microscope, without an external stand, is capable of resolving parallel lines 5 µm apart placed on the base, and more preferably lines 2 µm apart.

The lens 14 is mounted in a transparent focussing ring 7, which may be screwed into a thread mounting so that it may be turned moving the lens 14 in and out to adjust fine focus of the image. Otherwise the lens 14 may be moved in and out by a small electrical actuator to provide an autofocus facility as used on webcams and mobile phones.

An IR cut filter 16 may also be included at the bottom of the baffle to prevent infra red light reaching the sensor 12 and degrading the image. A number of LEDs 17 mounted above, and shining through, the focussing ring 7 may provide illumination onto the top of the sample. Two to eight LEDs 17 would normally be used but embodiments are also possible with more or fewer LEDs. A knob may be provided to adjust the brightness of these LEDs 17.

In this second embodiment, the head 2 and arm 3 assembly, shown in FIG. 6, is permanently attached to the base 1 by the threaded bar 11. This bar has a coaxial hole drilled in its centre to pass a cable from the base 1 to the head 2. The bar 11 is spring loaded 37 so that the arm 3 is securely locked in either the operating or the flat transport position. The arm 3 is moved between these two positions by pulling it away from the base 1 against the tension of the spring 37 and then rotating the arm in to the other position.

FIG. 6 also shows the mechanism for moving the head 2 up and down the arm 3 to achieve the correct course focus for samples of varying height. This mechanism ensures that the head 2 is tightly locked to the arm 3, once it is in the desired position, to avoid any movement that would degrade the image. A 6 mm diameter bar 19 runs for most of the height of the arm 3 between simple bearings at the top and bottom of the bar 19. The centre section of the bar 19 is machined or fabricated down to a diameter of 5 mm, which is eccentric with the top and bottom sections. The head 2 slides up and down the arm 3 as shown and the lug 20 of the head 2 runs along the eccentric section of the bar 19. The eccentric form of the bar 19 allows it to be rotated using a thumb wheel or lever 6 such that it either locks the head 2 tightly against the arm 3 to produce a stable image, or releases the head 2 to slide freely up and down the arm 3 to adjust the course focus. This mechanism allows the microscope to be focused for samples of 0 mm to 30 mm thick placed on the base 1.

The head 2 and arm 3 mechanism may also incorporate a scale to assist the user in setting the correct distance between the sample and the head 2. Once the correct position is set, the head 2 is locked to the arm 3 and the focussing ring 7 used to adjust fine focus.

Typical dimensions for the moving head, may be H=30 mm×W=60 mm, though other dimensions may also be used.

Figure 7:
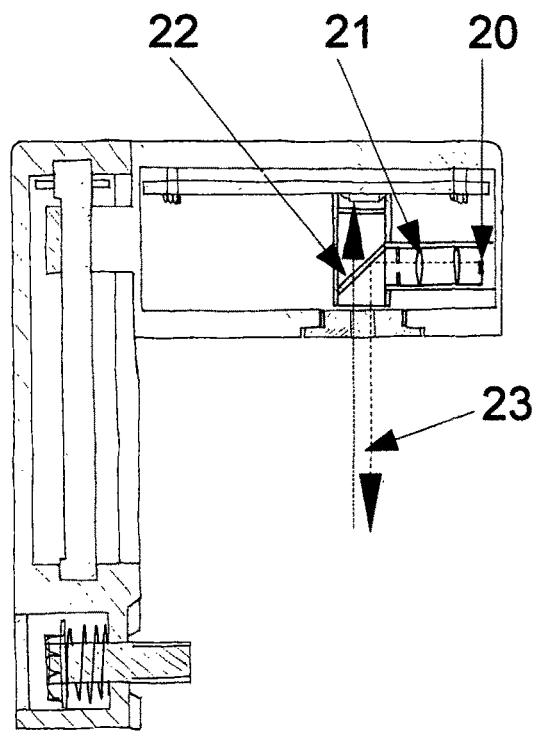
FIG. 7 shows a vertical section through the arm and head illustrating an alternative sample illumination system.

FIG. 7 shows a third embodiment of the optical head 2 assembly using an alternative illumination system for the sample instead of the LEDs in the previous embodiments. This third embodiment uses a light source 20, a system of lenses 21 and a partial mirror 22. This optical arrangement ensures that the image of the light source 20 itself is completely defocussed at the sample so that it is not present in the sample image recorded by the camera. The result is an even and diffuse illumination of the sample.

FIG. 7 also shows the path of the light 23 from the light source 20 to illuminate the sample and then back through the partial mirror 22 to the camera.

This technique is not novel. It is called Kohler illumination and is widely used in laboratory microscopes, but not generally in low cost microscopes.

Kohler illumination also allows an adjustable aperture to be designed into the illumination system. Adjusting this illumination aperture controls the contrast and brightness of the image. Additional masks, polarisers and phase plates can be inserted into the Kohler illumination system to produce dark field, crossed polarized or phase contrast images similar to those produced by laboratory microscopes.

Figure 8:
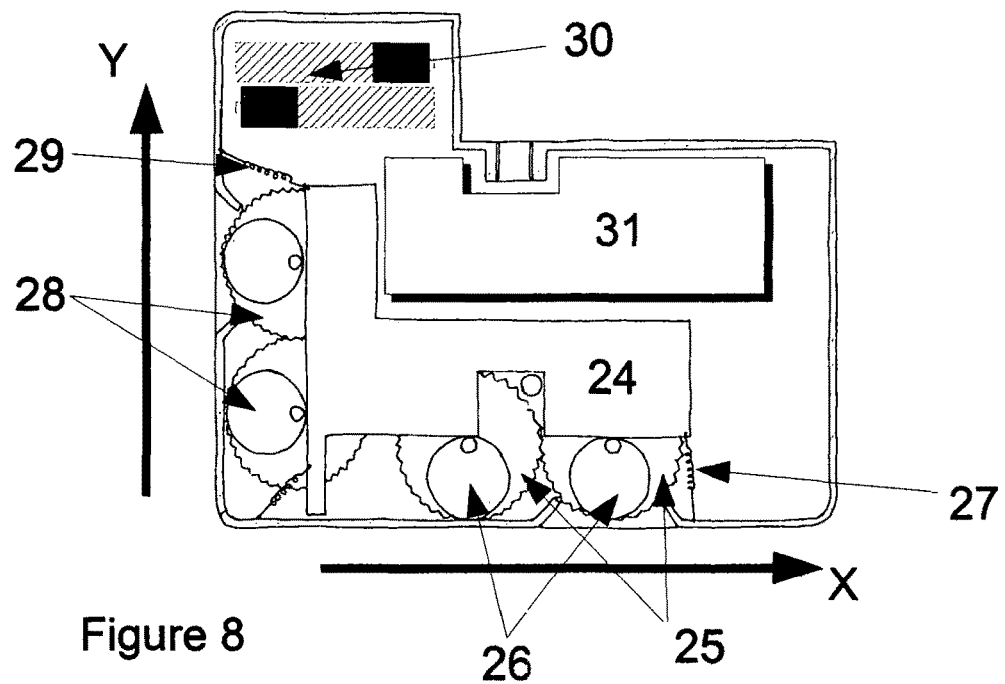
FIG. 8 shows a mechanism for positioning the slide on the base to select the area of the sample to be viewed.

FIG. 8 shows a horizontal section through the base 1, illustrating an apparatus for positioning a sample slide on the base 1 to select the part of the sample to be viewed. The description refers to the perpendicular axes X and Y in the plane of the diagram as shown.

A plate 24 is attached to the underside of the sample stage (not shown) on which the microscope slide is mounted. Two or more wheels 25 are located partially overlapping the side of the plate 24 that is parallel to the X axis. Each wheel 25 features an eccentric cam 26, which is in contact with the side of the plate 24. The wheels 25 are mechanically connected either by intermeshed gears, as shown, or by any other method such that the wheels 25 and cams 26 turn together. The plate 24 is held against the eccentric cams 26 by a force 27 provided by springs or any other mechanism.

When one of the wheels 25 is turned by the user, the other wheel 25 and cam 26 move together to push the plate 24 against the force 27 and so move the sample in the direction of the Y axis. The movement range of the stage 4 is limited by the design of the eccentric cams 26 and would typically be 10 mm.

Similarly a second set of one or more connected wheels with cams 28 may be mounted partially overlapping a second side of the plate 24, parallel to the Y axis and perpendicular to the first side of the plate 24. These push the plate 24 against a second force 29 to provide controlled movement of the stage 4 in the direction of the X axis. Together these two sets of wheels and cams allow the sample to be positioned in the plane of the base 1 with sufficient accuracy and ease of use. The movement range using this mechanism would be limited to about 10 mm in each direction parallel to the X and Y axes.

FIG. 8 also shows example positions for the batteries 30 and electronics PCB 31 within the base 1. A USB socket may also be provided within the base 1 or elsewhere for wired communications and for charging the batteries 30.

A radio module may be fitted in the base 1, the head 2, or elsewhere to provide wireless communications. The wireless communication may be conventional Wi-Fi®, such as IEEE 802.11n, Wi-Fi Direct® or any other protocol. Wi-Fi Direct® is a peer to peer protocol that allows the microscope to connect directly to the local display device without a wireless access point or router. This is very useful when the microscope is used in remote locations where there is no internet.

Near Field Communications (NFC) or other RFID protocols may also be fitted to the microscope to assist in pairing it with a tablet, PC or smart phone.

The present invention provides for one or more display implementations to allow the user to select the portion of the sample to be viewed; focus and optimise the image properly and view, store and share images. These display implementations are combinations of mechanical, optical and software design. The software image processing algorithms may be provided either within the microscope, within an external display device or on the internet.

Figure 9:
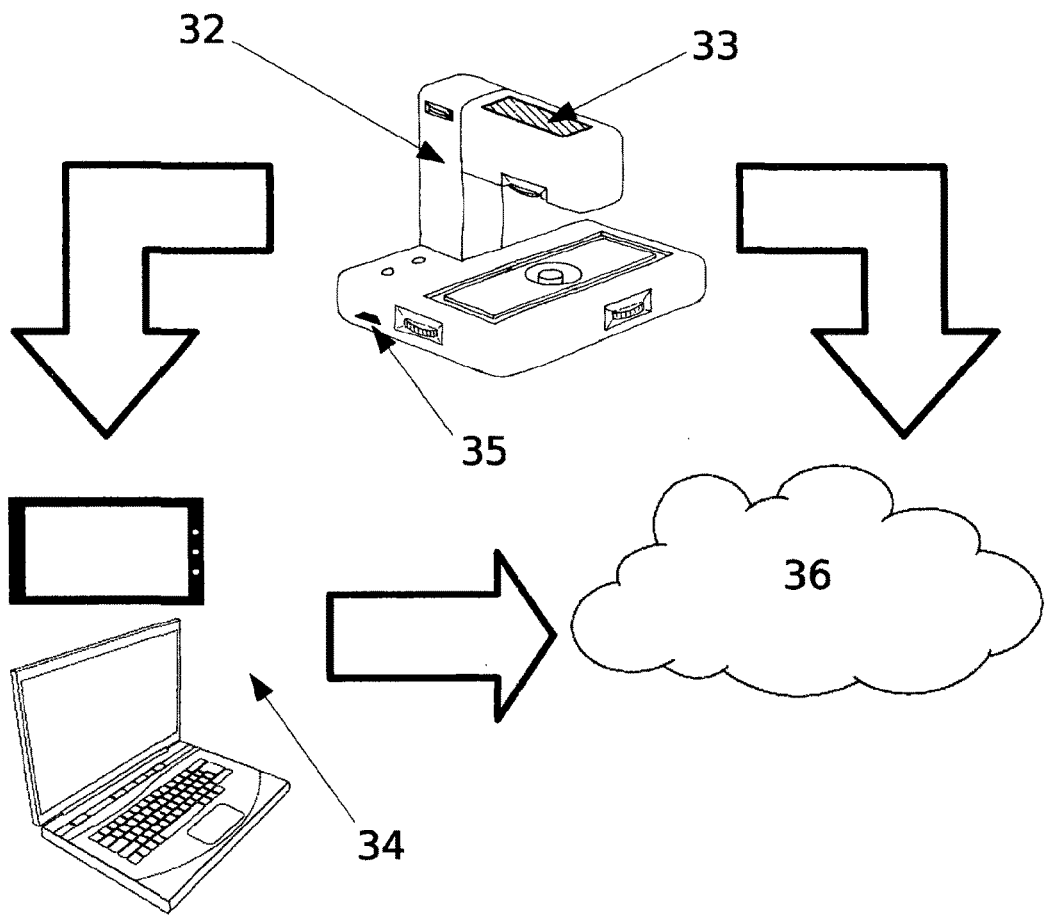
FIG. 9 shows an example practical system diagram illustrating the connectivity features of the microscope.

FIG. 9 shows a system diagram illustrating several display implementations for viewing, storing and sharing images.

A first display implementation of the microscope 32 features a small display 33, which may be used to view, focus and store the image. The display 33 may be operated by virtual buttons on the screen 33 or physical buttons on the microscope 32.

A second display implementation uses a local display device 34 connected to the microscope 32. The local display device 34 may be any digital device capable of reproducing an image. The local display device 34 would normally be a portable computer with a display, for example a smart phone, tablet or laptop computer, but it could also be a desktop computer, projector or any other display device.

The local display device 34 may be connected with a wired connection, such as a USB cable connected between the local display device 34 and a USB connector 35 provided on the microscope 32.

Otherwise the local display device may be connected to the microscope 32 using a wireless protocol such as Wi-Fi® (IEEE 802.11n) or Wi-Fi Direct®.

In the case of a wireless connection, it is necessary to identify the microscope 32 to the local display device 34. This process is called pairing and may be achieved using an established public domain Radio Frequency Identification (RFID) protocol such as Near Field Communications (for example NFC or ECMA-340 or ISO/IEC 18092) or any other method.

An example process for viewing the image on a local device 34 using NFC and Wi-Fi® might be as follows:
1. Switch on the NFC function on the local display device 34.
2. Switch on the microscope 32.
3. Touch the local display device 34 against the microscope 32. NFC identifies the microscope 32 to the local display device 34 and communicates which software is required.
4. The local display device 34 will ask the user whether they wish to download the appropriate application software (app) from the public app store provided by the operating system of the local display device 34.
5. The user answers 'yes' and the app is downloaded, provided an internet connection is present. If no internet connection is present (for example in a remote field location) the app must be downloaded from the internet and saved on the local display device 34 beforehand, when an internet connection is available.
6. The app detects the connection to the microscope 32 and asks the user whether they wish to view an image from that microscope 32.
7. If the user answers 'yes' then the image will be displayed on the screen of the local display device 34 and the user can focus the microscope 32 and select the portion of the image to be viewed.
8. Once the user is satisfied with the image, they may press a 'capture' button on the app to save the picture to memory either in the microscope 32 or in the local display device 34, according to settings in the app.

The public domain connection protocols described in this second display implementation may be used to view, optimise and store the image even at remote locations where no internet connection is available. It also allows the images stored on the microscope 32 or local display device 34 to be shared once an internet connection 36 is available. Sharing may be achieved using public domain photograph sharing websites; social media websites, proprietary websites or any other method.

A third display implementation allows the microscope 32 to be connected directly to the internet 36 so that images can be shared instantly. This third example display implementation is useful in applications such as teaching because images from several microscopes can be projected immediately onto a screen for a class.

FIG. 9 shows the microscope 32 connected to a local display device 34 as described previously. In this third display implementation, the local display device 34, may be used to set a unique network identity (or name) and password for the microscope 32 and then connect each microscope 32 to a local Wi-Fi® network. In this way images from any number uniquely identified and password protected microscopes 32 may be viewed on a website and projected instantly onto a screen for teaching and other applications. Microscope images can also be shared globally on social networking websites to facilitate team projects and to build a shared user community.

Once the network identity and password of a microscope 32 is set, the local display device 34 may be removed and images may be viewed over the internet as long as a wireless network is present.

A fourth display implementation allows direct connection of the microscope 32 to the internet 36 without using a local display device 34. This may be achieved using the display 33 and buttons to connect to the WiFi network and a factory set unique identifier (for example a serial number) and password. Pairing may be confirmed using the display 33 and buttons on the microscope 32 to confirm the identity of the microscope 32 to the website.

Software may be provided on the microscope 32, on the local display device 34 or on a website to facilitate focusing, to optimise the image or to enhance the images captured. Examples of software functionality are given below:

Software may be used to provide a lower resolution image or a high resolution image of a small portion of the sample to assist positioning of the slide and focussing. These smaller images need less data and may be sent to the display very quickly. This means that the display responds immediately to adjustments in focus or position. When the capture button is pressed, a high resolution image is captured, stored and may be transmitted to the display device 34. This may take a few seconds, but the delay is less of a concern than it would be when focusing or positioning the image.

The fine focus ring 7, seen in FIG. 1 and FIG. 6, may be fitted with small electric motors so that focus and position may be set automatically. Software may be used to detect focus and position the fine focus ring 7 correctly in the same way as most digital cameras provide autofocus.

In FIG. 8, the X and Y positioning adjusters 25 and 28 may also be fitted with small electric motors allowing the sample to be moved with respect to the optical head 2. Software may be used to capture a high resolution image of the entire sample area by stitching together multiple small images and moving the sample between each image to give a large area high resolution image.

Automatic adjustment of the focus and the sample position, as described above, may be used to scan multiple images at different focal lengths. Software may be used to combine these images into a three dimensional visualisation of the sample. This facility will be very useful in medical and metrology applications.

In FIG. 7, the relative strength of the Kohler and conventional illumination and the selection of filters may also be automated. Software may control sample illumination to provide high contrast images and to look at the sample edges in great detail.

Figure 10:
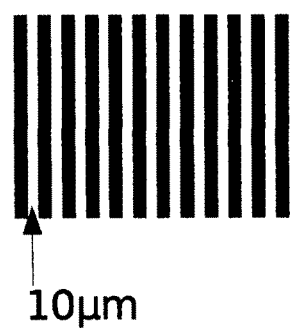
FIG. 10 shows a test pattern used to define the resolution of the microscope.

FIG. 10 shows a diagram of a typical test pattern of parallel lines separated by 10 μm, which may be used to test the resolution of a microscope. This invention relates to self contained microscopes that can resolve this test pattern, without additional stands or ballast, such that the individual lines can be seen. Portable magnifiers with lower resolution are well known, but will view this pattern as a fuzzy rectangle rather than discrete lines, unless additional stands and ballast are used to stabilise the magnifier.

The invention claimed is:

1. A self-contained microscope, the microscope comprising a base for receiving a sample to be viewed and an optical head supported by the base and movably mounted to the base, the optical head comprising a digital camera, wherein the optical head is mounted to the base by a mount and movably positionable by the mount relative to the base between a first position, in which the digital camera is stably positioned by the mount relative to the base in the first position without any additional stabilization structure so that the microscope with the optical head positioned in the first position is operable to view a sample received on the base with sufficient stability so as to be able to resolve parallel lines of a test pattern located on the base having the parallel lines spaced 10 pm apart, and a second position in which the optical head is moved from the first position relative to the base so as to be positioned coplanar with the base, and the microscope when configured in the second position with the optical head positioned coplanar with the base forms a substantially flat shape less than 30 mm thick, and a lock operably associated with the base and the optical head to lock the digital camera assembly optical head relative to the base in the first position, to allow for a stable image to be obtained by the optical head digital camera.

2. A self-contained microscope as claimed in claim 1, wherein the mount is a pivotal mount having a single hinged joint operable to rotate the optical head between the first and second positions.

3. A self-contained microscope as claimed in claim 1, wherein the optical head is removable from the base.

4. A self-contained microscope as claimed in claim 1, in which the microscope is stably positioned relative to the base in the first position without any additional stabilization structure so that the microscope with the optical head positioned in the first position is operable to view a sample received on the base with sufficient stability so as to be able to resolve parallel lines of a test pattern located on the base having the parallel lines spaced 5 μm apart.

5. A self-contained microscope as claimed in claim 1, in which the microscope is stably positioned relative to the base in the first position without any additional stabilization structure so that the microscope with the optical head positioned in the first position is operable to view a sample received on the base with sufficient stability so as to be able to resolve parallel lines of a test pattern located on the base having the parallel lines spaced 2 μm apart.

6. A self-contained microscope as claimed in claim 1, wherein the microscope when configured in the second position with the optical head positioned coplanar with the base forms a flat shape less than 25 mm thick.

7. A self-contained microscope as claimed in claim 1, wherein the microscope when configured in the second position with the optical head positioned coplanar with the base forms a flat shape less than 20 mm thick.

8. A self-contained microscope as claimed in claim 1, wherein the base is configured to receive a microscope slide having a size of about 76 mm×26 mm for viewing.

9. A self-contained microscope as claimed in claim 1, wherein the maximum height of the microscope when the optical head is in the first position is less than 1.5 times the maximum width of the base.

10. A self-contained microscope as claimed in claim 1, wherein the maximum height of the microscope when the optical head is in the first position is less than the maximum width of the base.

11. A self-contained microscope as claimed in claim 1, further comprising an integral or remote display operably associated with the digital camera for viewing an image obtained by the digital camera.

12. A self-contained microscope as claimed in claim 1, further comprising a light source operable when the microscope is configured in the first position to illuminate a sample received on the base from the opposite side of the sample from the digital camera or the same side of the sample as the digital camera or both.

13. A self-contained microscope as claimed in claim 1, further comprising a light source operable when the microscope is configured in the first position to illuminate a sample received on the base through an objective lens of the digital camera so that the image of the light source is fully de-focussed in the plane of the sample to give an even illumination of the sample.

14. A self-contained microscope as claimed in claim 1, wherein when the microscope is configured in the first position the digital camera is adjustably positionable in distance from the base to allow for focussing the digital camera.

15. A self-contained microscope, the microscope comprising:
a base for receiving a sample to be viewed;
an optical head supported by the base and movably mounted to the base by a mount between (1) a first position in which the digital camera is stably positioned by the mount relative to the base in the first position without any additional stabilization structure so that the microscope with the optical head positioned in the first position is operable to view a sample received on the base, and (2) a second position in which the optical head is moved from the first position relative to the base so as to be positioned coplanar with the base and the microscope when configured in the second position with the optical head positioned coplanar with the base forms a substantially flat shape less than 30 mm thick; and a lock operably associated with the base and the optical head to lock the optical head relative to the base in the first position, to allow for a stable image to be obtained by the optical head.

16. A self-contained microscope, the microscope comprising:

a base for receiving a sample to be viewed, the base including a sample stage for receiving the sample to be viewed, and wherein the sample stage is mounted for movement relative to the base to select an area of the sample to be viewed by the digital camera;

an optical head supported by the base and movably mounted to the base by a mount between (1) a first position in which the digital camera is stably positioned by the mount relative to the base in the first position without any additional stabilization structure so that the microscope with the optical head positioned in the first position is operable to view a sample received on the base, and (2) a second position in which the optical head is moved from the first position relative to the base so as to be positioned coplanar with the base and the microscope when configured in the second position with the optical head positioned coplanar with the base forms a substantially flat shape less than 30 mm thick; and an adjustment mechanism comprising a plate secured to the sample stage, a first bias member connected to the plate and operable to urge the plate in a first direction relative to the base, a first set of at least two mechanically linked wheels, each wheel having an eccentric cam mounted thereon, the cams contacting a first edge of the plate, a first rotatable member operably associated with the first set of wheels and operable to rotate at least one of the wheels of the first set of wheels, whereby rotating any one of the wheels of the first set of wheels rotates all the wheels of the first set of wheels and all the cams, such that the cams press against the edge of the plate to move the plate in a second direction opposite to the first direction in opposition to the bias member.

17. A self-contained microscope as claimed in claim 16, wherein the adjustment mechanism further comprises a second bias member operable to urge the plate in a third direction perpendicular to the first and second directions, a second set of one or more wheels each having an eccentric cam mounted thereon, the cams contacting a second edge of the plate perpendicular to the first edge, and a second rotatable member operably associated with the second set of wheels and operable to rotate all of the second set of wheels together, whereby rotating the second set of wheels rotates the cams mounted thereon, such that the cams press against the second edge of the plate to move it in a fourth direction opposite to the third direction in opposition to the second bias member.

* * * * *